United States Patent
Hjertberg et al.

(10) Patent No.: US 7,077,480 B2
(45) Date of Patent: Jul. 18, 2006

(54) NUTS FOR SECURING SPOKES TO RIMS

(76) Inventors: Eric Alan Hjertberg, No. 487, Guojung Rd., Dali City, Taichung (TW); Douglas Chiang, No. 487, Guojung Rd., Dali City, Taichung (TW)

( * ) Notice: Subject to any disclaimer, the term of this patent is extended or adjusted under 35 U.S.C. 154(b) by 9 days.

(21) Appl. No.: 11/011,151

(22) Filed: Dec. 15, 2004

(65) Prior Publication Data

US 2006/0125312 A1 Jun. 15, 2006

(51) Int. Cl.
*B60B 21/06* (2006.01)

(52) U.S. Cl. ......................................... 301/58; 301/104

(58) Field of Classification Search .................. 301/55, 301/58, 95.104, 95.106, 104
See application file for complete search history.

(56) References Cited

U.S. PATENT DOCUMENTS

| 1,280,646 | A | * | 10/1918 | Billhartz | 301/58 |
| 1,734,184 | A | * | 11/1929 | Stoler | 411/427 |
| 6,036,281 | A | * | 3/2000 | Campbell | 301/104 |
| 6,048,035 | A | * | 4/2000 | Chen | 301/30 |

* cited by examiner

*Primary Examiner*—Russell D. Stormer

(57) ABSTRACT

A bicycle wheel includes a rim with a plurality of holes defined therethrough and each hole receives an insertion section of a nut. The insertion section is enclosed by an inner periphery of the hole and an end surface of the insertion section is in flush with an inner periphery of the rim. A threaded hole is defined in the end surface of the insertion section. A plurality of spokes each have a threaded end at a first end thereof so as to be threadedly connected to the threaded hole of one of the nuts. A hooking end is connected at a second of each spoke so as to be connected to a hub.

4 Claims, 5 Drawing Sheets

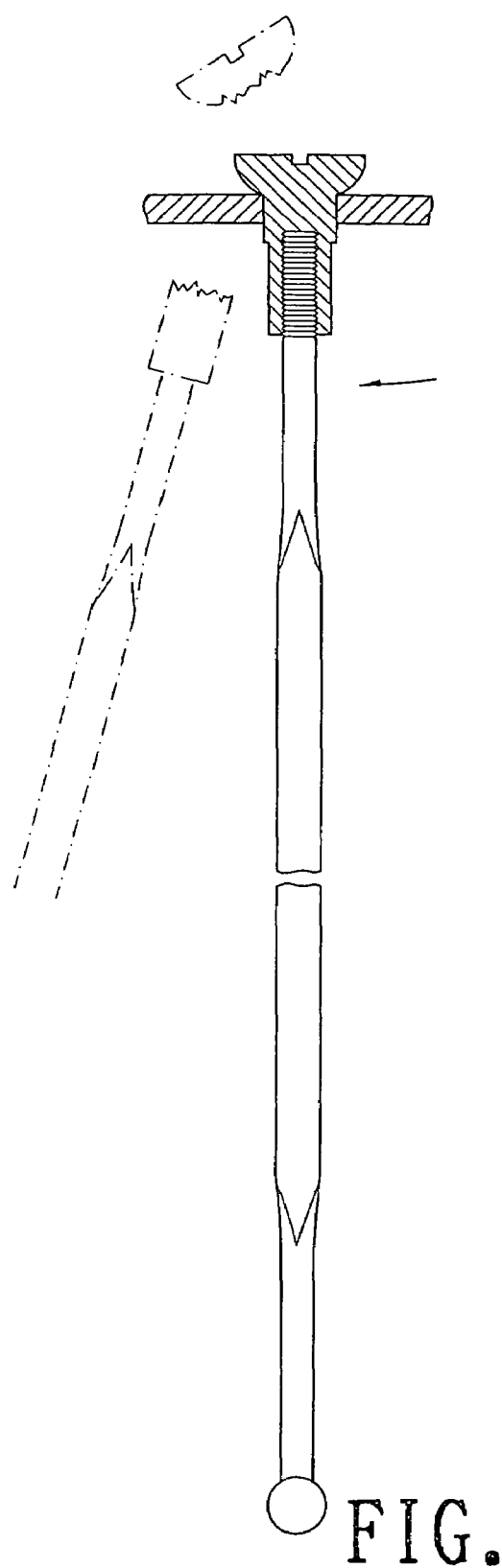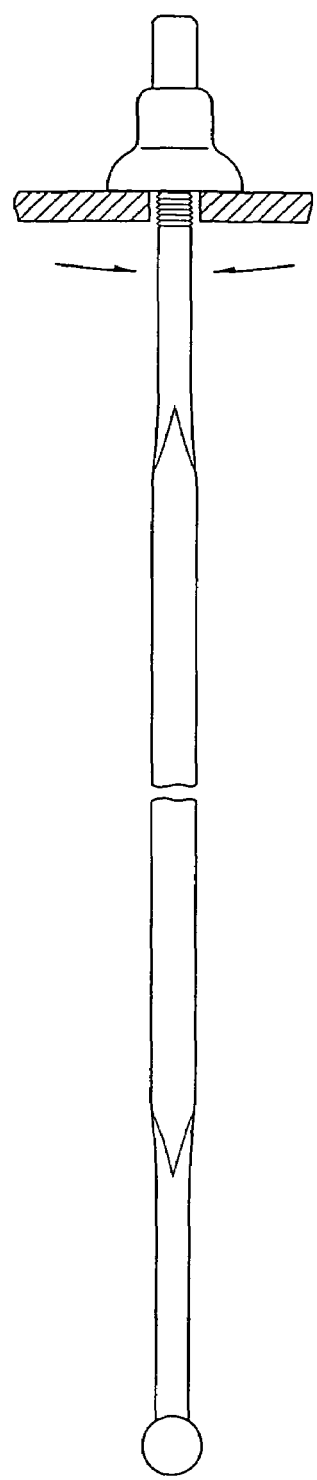
FIG. 8
PRIOR ART
FIG. 7
PRIOR ART

NUTS FOR SECURING SPOKES TO RIMS

FIELD OF THE INVENTION

The present invention relates to a securing nut for securing spokes, wherein the nut has an end inserted in the hole of the rim and the end is in flush with an inner periphery of the rim.

BACKGROUND OF THE INVENTION

A conventional way for securing spokes to a bicycle rim is disclosed in FIG. 7, and generally includes a plurality of holes defined through the rim and the spokes each have a threaded end which extends through the hole and a nut is threadedly connected to the threaded end from outside of the rim. It is noted that stress concentration occurs at the connection portion between the rim and the spokes so that the spokes break at the threaded end that extends through the holes. FIG. 8 shows another conventional way to position the spokes wherein the nut is inserted through the hole in the rim and threadedly connected to the threaded end of the spoke. The nut has a section that is extended through the hole could be broken due to stress concentration.

The present invention intends to provide a nut that includes an insertion section and a stop flange, the insertion section is retained in the hole of the rim and a distal end of the insertion section is in flush with the inner periphery of the rim. The spoke is then threadedly connected to the insertion section.

SUMMARY OF THE INVENTION

The present invention relates to a bicycle wheel that includes a rim with two sidewalls and a connection portion is connected between the two sidewalls. A plurality of holes are defined through the connection portion. A plurality of nuts each have an insertion section at a first end thereof and a driving end is disposed on a second end of the each of the nuts. The insertion section is enclosed by an inner periphery of the hole and an end surface of the insertion section is in flush with an inner periphery of the rim. A threaded hole is defined in the end surface of the insertion section so as to connect with a threaded end of one of spokes. Each spoke further has a hooking end for being connected to a hub.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 7 shows a combination of a conventional nut, spoke and rim, and

FIG. 8 shows a combination of another conventional nut, spoke and rim.

DETAILED DESCRIPTION OF THE PREFERRED EMBODIMENT

Figure 1:
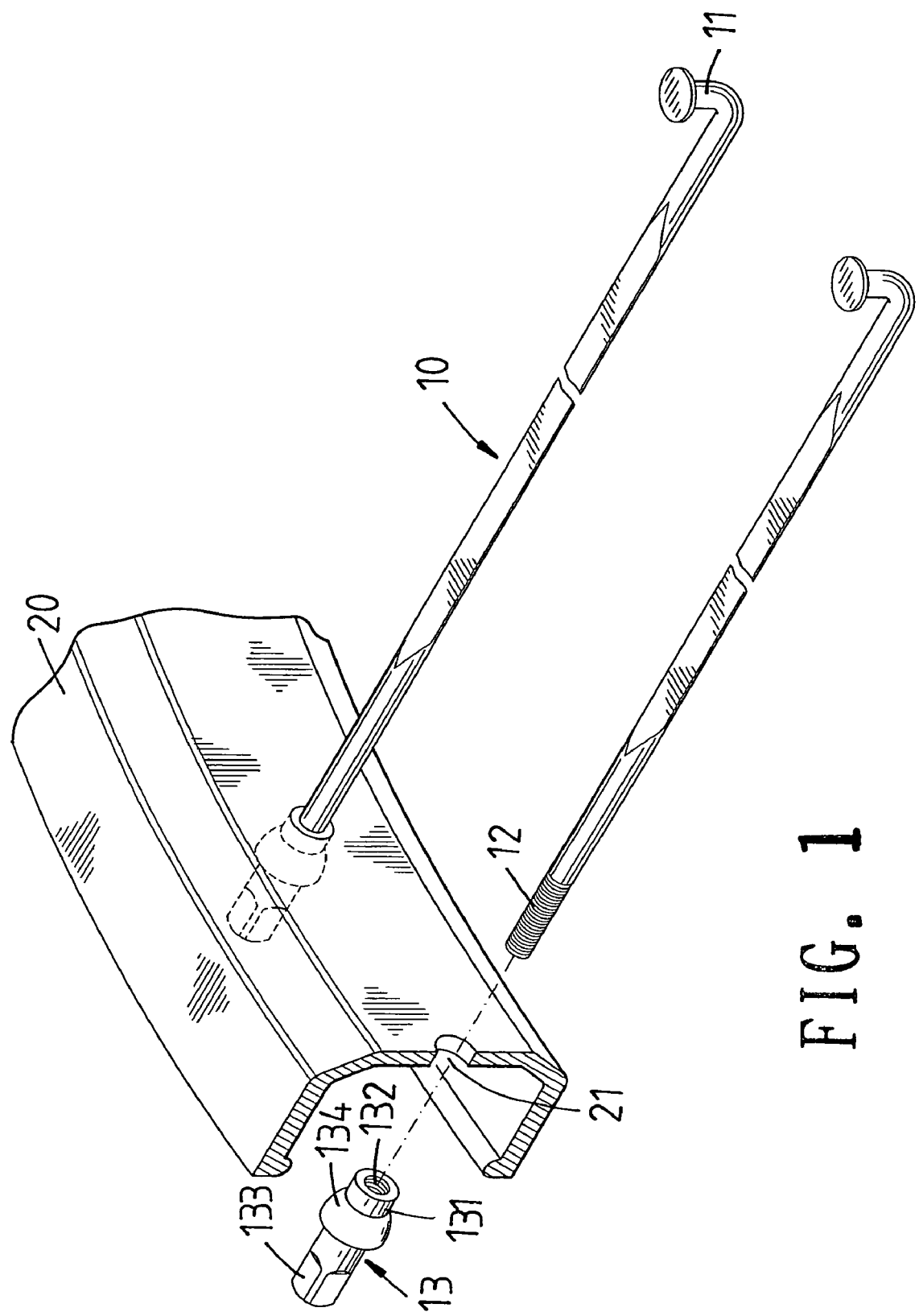
FIG. 1 is an exploded view to show the rim, the spokes and the nuts of the present invention.
Figure 2:
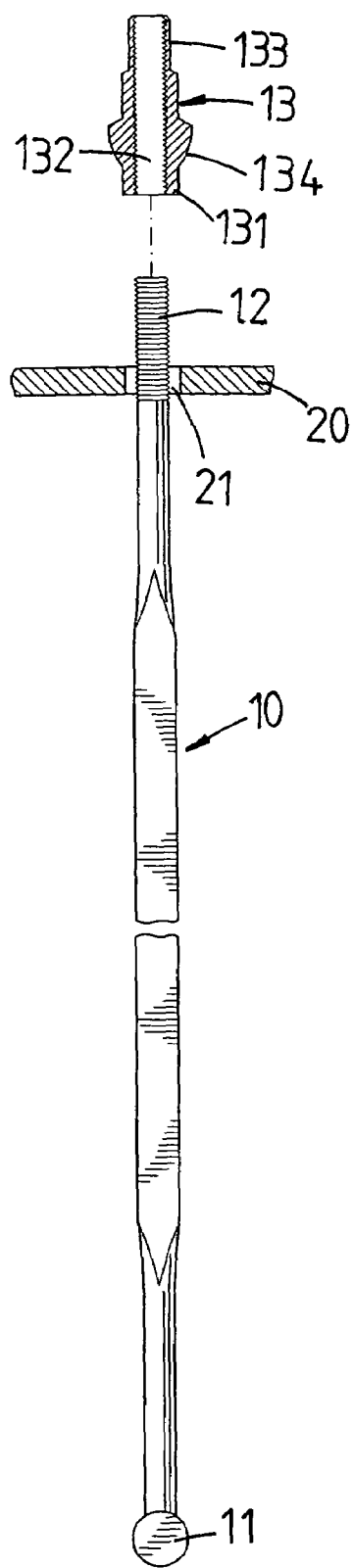
FIG. 2 is a cross sectional view to show the nut, the spoke and the rim.

Referring to FIGS. 1 to 3 and 6, the bicycle wheel of the present invention comprises a rim 20 with two sidewalls and a connection portion is connected between the two sidewalls. Each sidewall has a lip at an inside thereof so as to secure a tire which is not shown. A plurality of holes 21 are defined through the connection portion.

A plurality of nuts 13 each have an insertion section 131 at a first end thereof and a driving end 133 is disposed on a second end of the each of the nuts 13. The insertion section 131 is enclosed by an inner periphery of the hole 21 and an end surface of the insertion section 131 is in flush with an inner periphery of the rim 20. A threaded hole 132 is defined axially through each of the nuts 13 and opens to the end surface of the insertion section 131.

A plurality of spokes 10 each have a threaded end 12 at a first end thereof and a hooking end 11 at a second of each spoke 10. The threaded end 12 is threadedly connected to the threaded hole 132 of one of the nuts 13 and the hooking end 11 of the spoke 10 is connected to a hub. A flange 134 extends outward from a periphery of the but 13 and includes a bowl-shaped outer periphery which is engaged with the hole 21 in an outer periphery of the connection portion.

Figure 3:
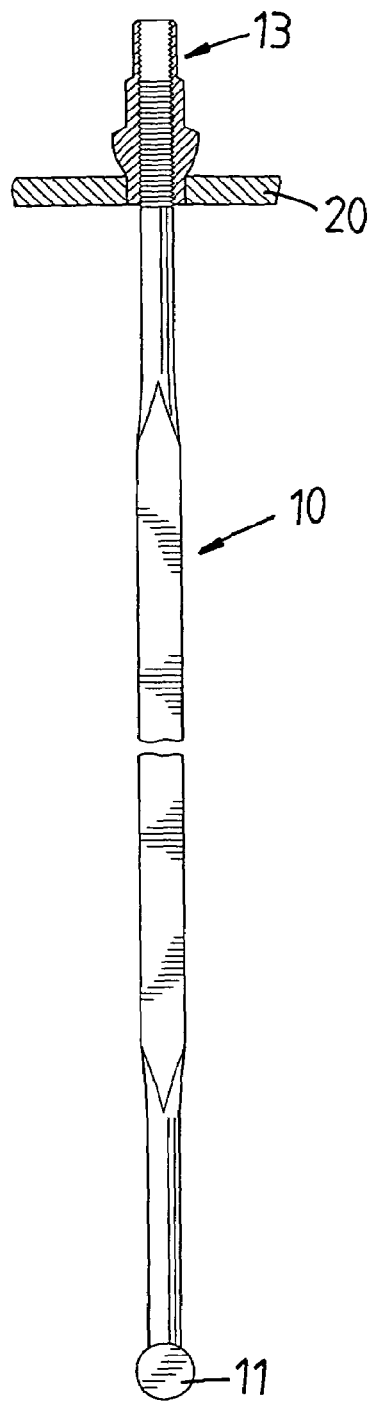
FIG. 3 is a cross sectional view to show that the nut is threadedly connected to threaded end of the spoke that extends through the hole of the rim.

The insertion section 131 is enclosed by the inner periphery of the hole 21 so that the rim 20 has a better structural strength. The threaded end 12 extends through the hole 21 and deeply and threadedly connected to the threaded hole 132 of the nut 13 as shown in FIG. 3 so that the connection between the nut 13 and the spoke 10 is strong enough to bear high stress. The driving end 133 of each of the nuts 13 includes a plurality of flat surfaces 133 so that the user can clamp the flat surfaces 133 by a tool to rotate the nut 13.

Figure 4:
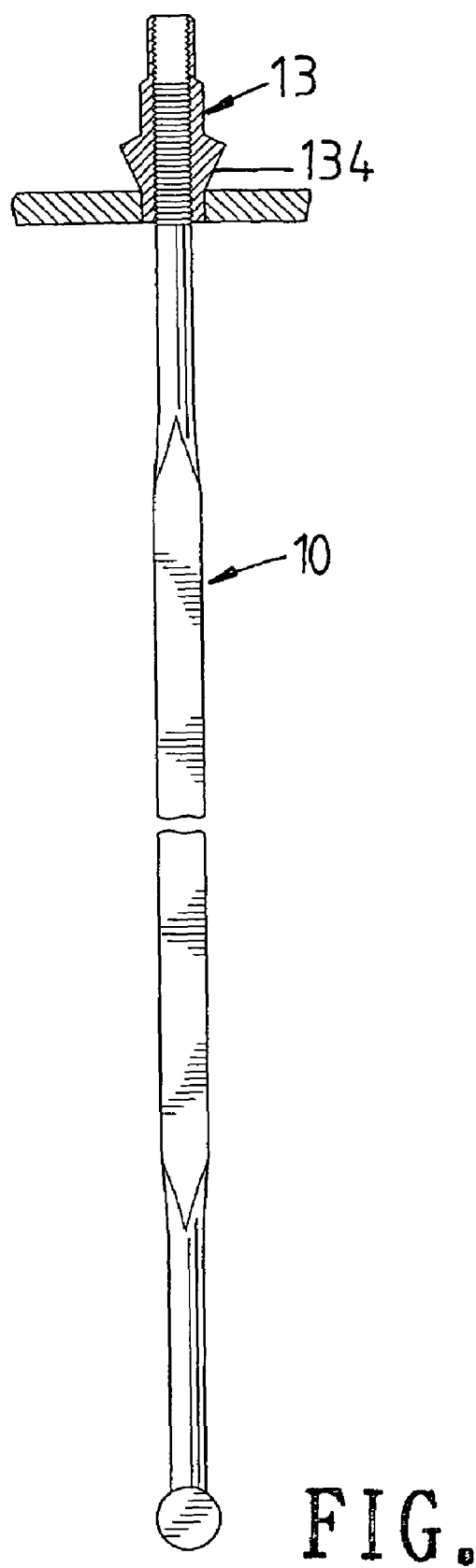
FIG. 4 shows a cross sectional view of another embodiment of the nut.
Figure 5:
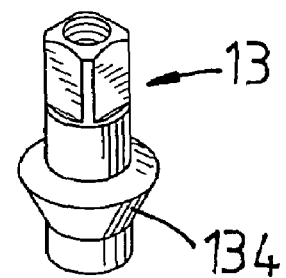
FIG. 5 is a perspective view of the nut in FIG. 4.
Figure 6:
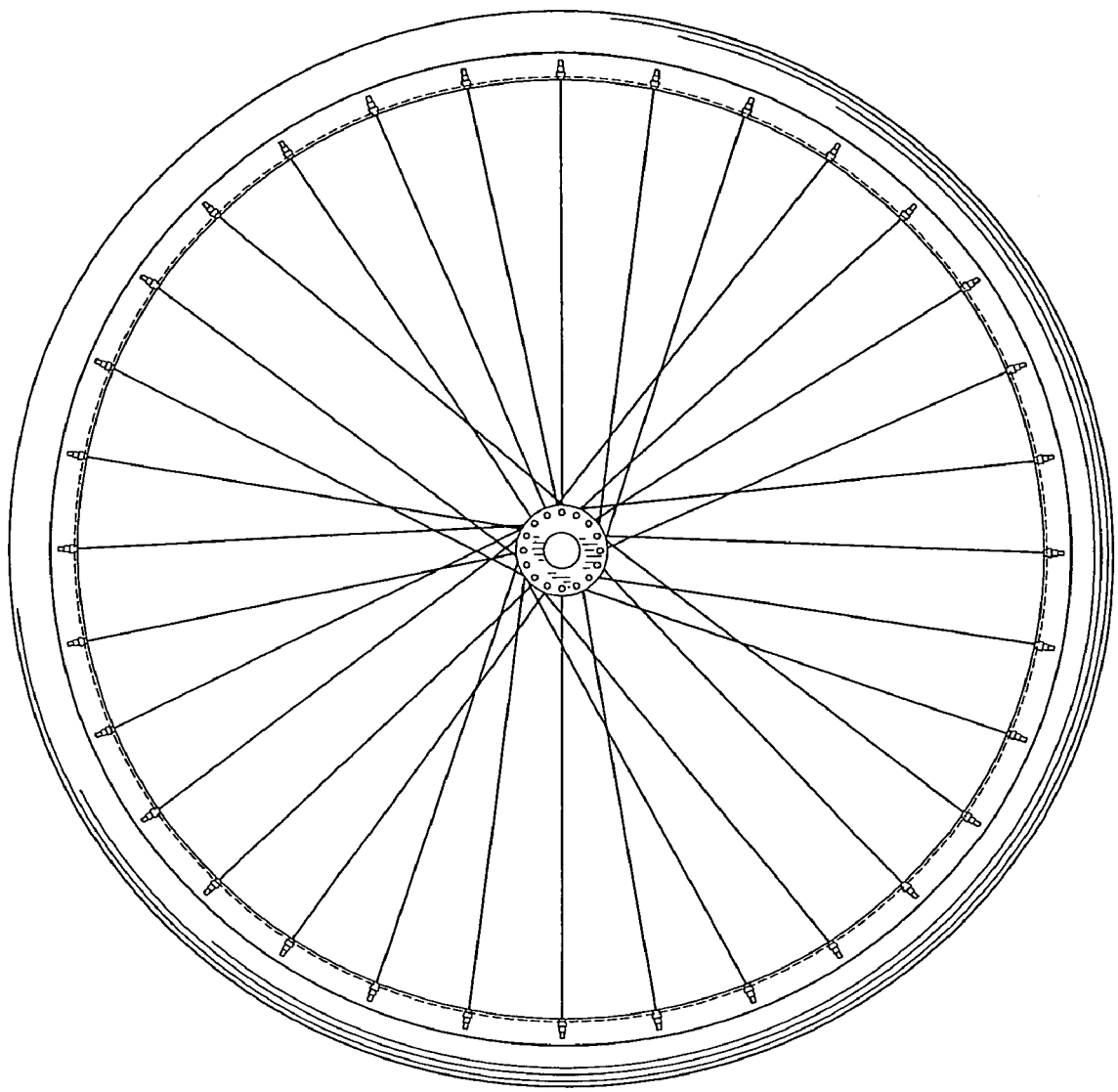
FIG. 6 shows the bicycle wheel of the present invention.

FIGS. 4 and 5 show another type of nut 13 wherein the flange 134 has tapered outer periphery.

While we have shown and described the embodiment in accordance with the present invention, it should be clear to those skilled in the art that further embodiments may be made without departing from the scope of the present invention.

What is claimed is:

1. A bicycle wheel comprising;
    a rim with two sidewalls and a connection portion connected between the two sidewalls, a plurality of holes defined through the connection portion;
    a plurality of nuts each having an insertion section at a first end thereof and a driving end disposed on a second end of the each of the nuts, the insertion section being enclosed by an inner periphery of the hole and an end surface of the insertion section being flush with an inner periphery of the rim, a threaded hole defined in the end surface of the insertion section, and
    a plurality of spokes each having a threaded end at a first end thereof and a hooking end at a second end of each spoke, the threaded end being threadedly connected to the threaded hole of one of the nuts and the hooking end of the spoke connected to a hub.

2. The bicycle wheel as claimed in claim 1, wherein a flange extends outward from the nut and includes a tapered outer periphery which is engaged with the hole in an outer periphery of the connection portion.

3. The bicycle wheel as claimed in claim 1, wherein the driving end of each of the nuts includes a plurality of flat surfaces.

4. The bicycle wheel as claimed in claim 1, wherein the threaded hole is defined axially through each of the nuts.

* * * * *